Nov. 20, 1934.  G. I. GOODWIN  1,981,505
CLUTCH
Filed Sept. 11, 1931  3 Sheets-Sheet 1
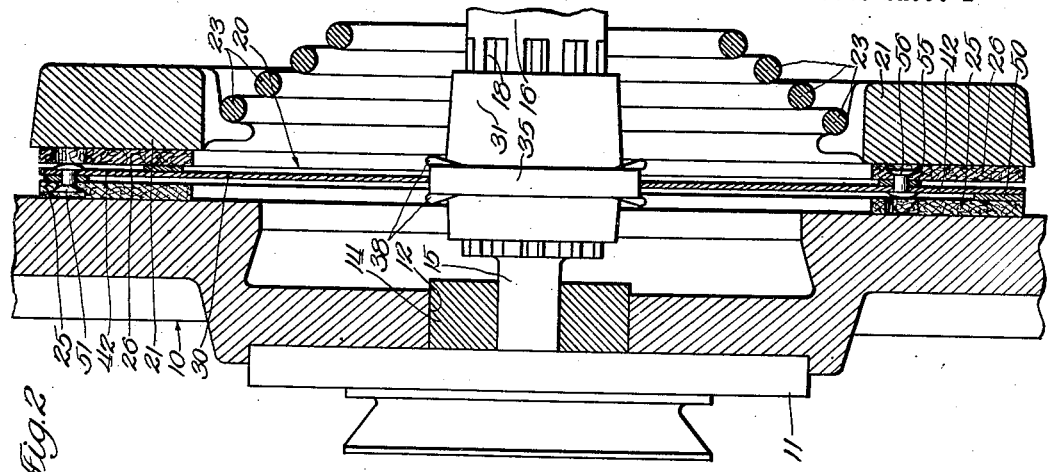
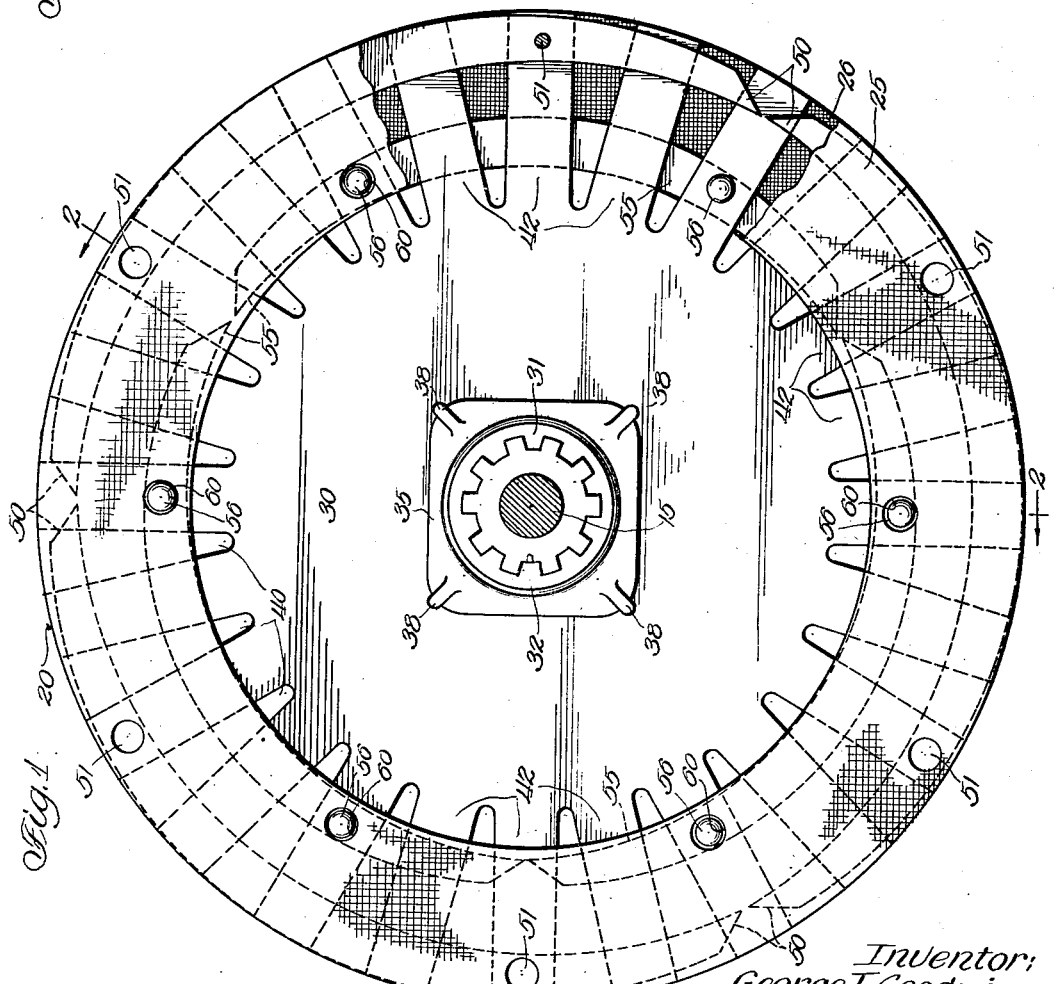
Inventor:
George I. Goodwin
By Brown, Jackson, Boettcher & Dienner
Attys.

Nov. 20, 1934.  G. I. GOODWIN  1,981,505
CLUTCH
Filed Sept. 11, 1931  3 Sheets-Sheet 2
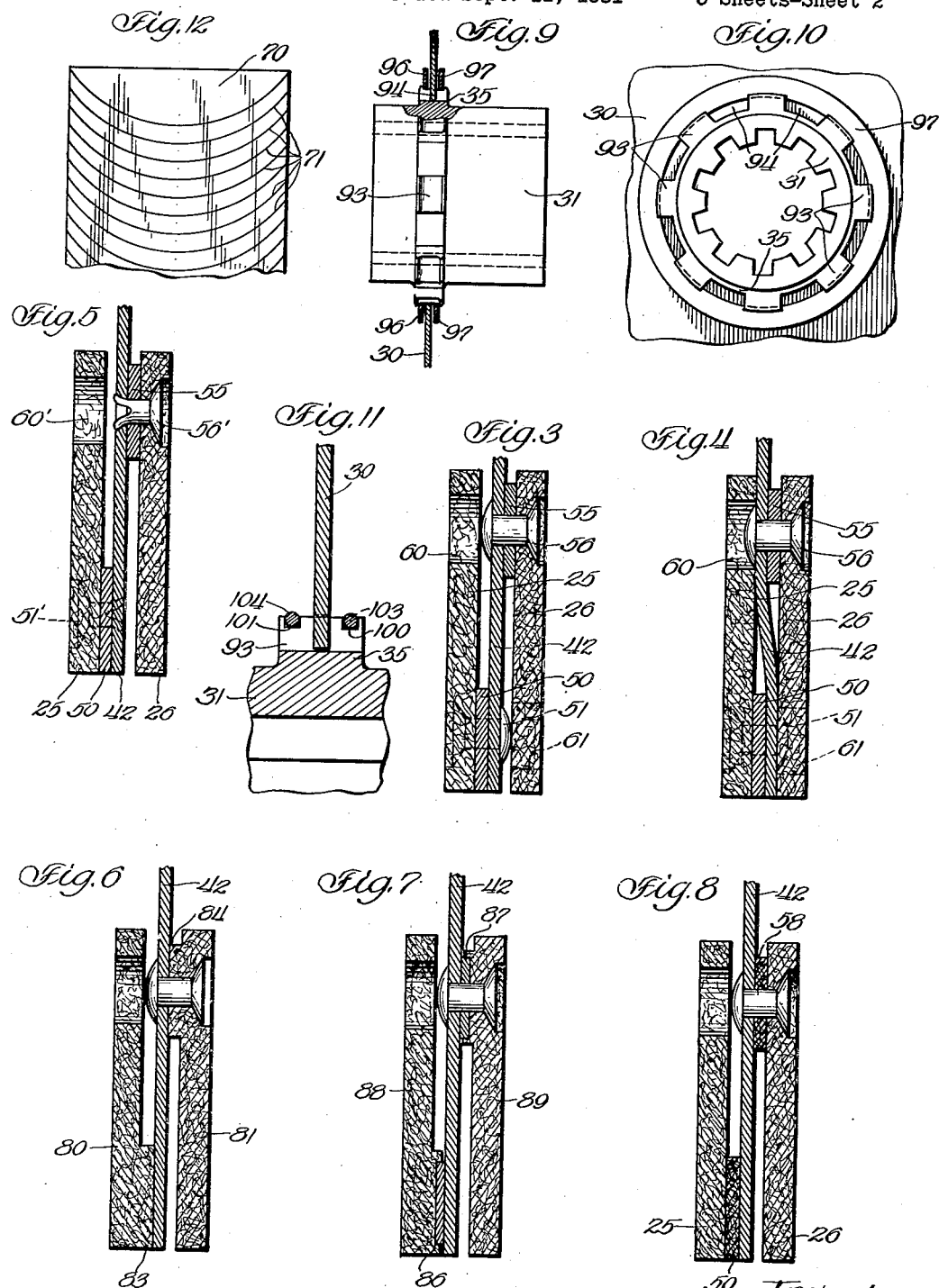
Inventor:
George I. Goodwin
By Brown, Jackson, Boettcher & Dienner
Attys.

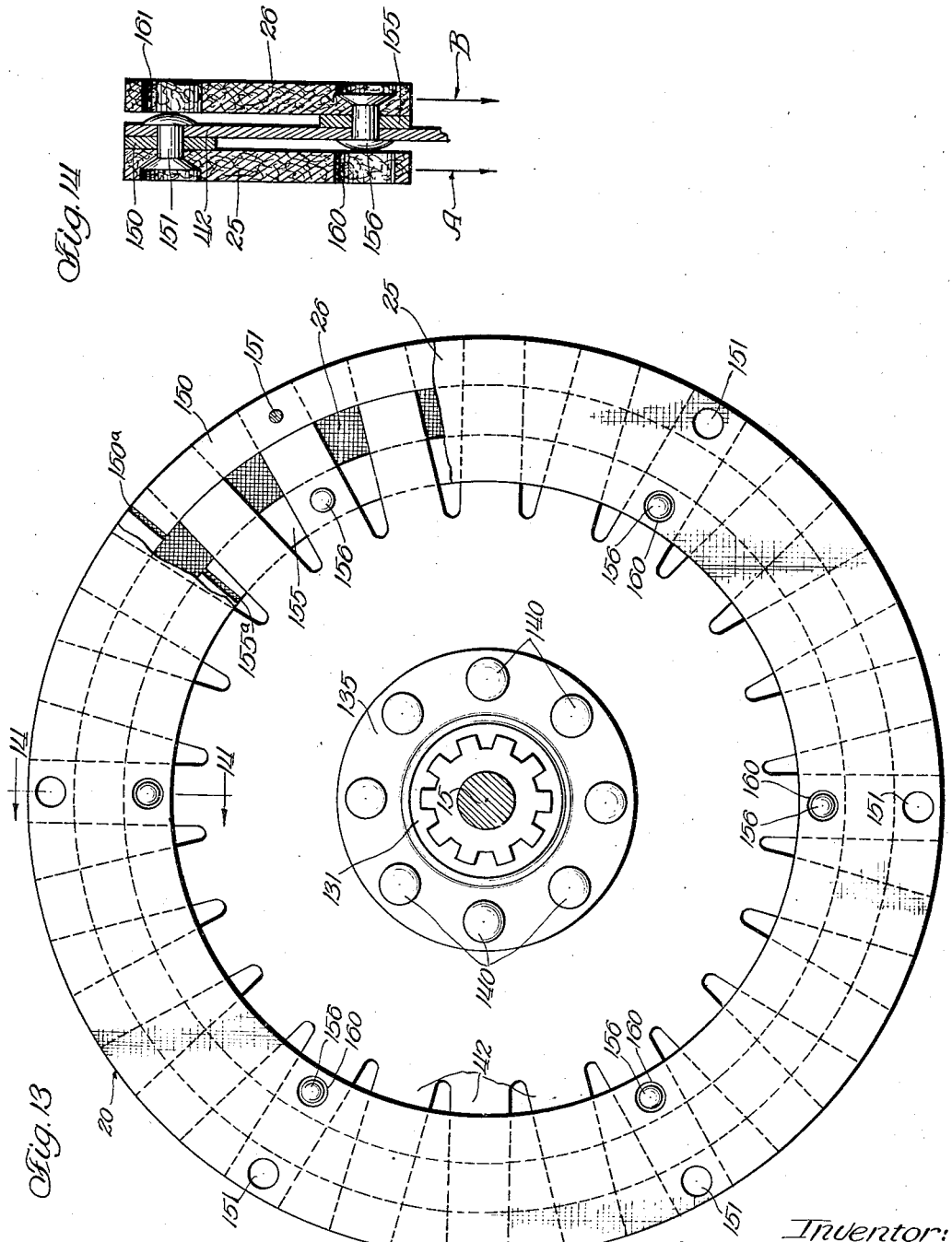

Patented Nov. 20, 1934

1,981,505

UNITED STATES PATENT OFFICE 1,981,505

CLUTCH

George I. Goodwin, Detroit, Mich.

Application September 11, 1931, Serial No. 562,217

13 Claims. (Cl. 192—107)

The present invention relates generally to means for transmitting driving torque and is particularly concerned with the provision of clutch means which takes hold smoothly and evenly throughout a considerable range of movement of the clutch engaging and disengaging parts. It is also the purpose of the present invention to provide a clutch part which is formed throughout of substantially flat parts which can be held to very small dimensional tolerances. Not only is it desirable that when the various clutch parts are manufactured and assembled in mass production quantities each will be practically exactly the same dimension as all of the others, but it is particularly desirable to provide a friction plate which has practically exactly the same thickness when measured at any point over the entire friction surface. Friction plates which vary in their thickness at different points are very apt to cause chatter during clutch engagement. The advantages resulting from such construction are such that the rotating parts would more nearly occupy a position at right angles to the axis of rotation so that no additional steps or operations are required to straighten the parts after assembly. Further, less tolerances are permitted in the completed clutch than would otherwise be permitted and less time need be spent in adjusting the completed clutch since all of the clutch parts referred to are of substantially the same size.

More specifically, it is the purpose of the present invention to provide a clutch plate arranged to transmit driving torque from a driving member to a driven member and is particularly applicable to the clutch structures used in automotive vehicles. Prior to my invention various and sundry expediences have been resorted to in order to secure a smoothly operating clutch. As will be generally understood, internal combustion engines have only very small torque at low speeds and hence in starting an automobile or the like it is necessary to have the motor turning over at a substantial rate in order to start the car without stalling the motor. This means that for a certain period the clutch parts must slip, but the clutch must be so constructed that the clutch surfaces will grip with gradually increasing force so as to start the car without jerk or delay.

Generally, the devices of the prior art intended to secure smooth operation include some sort of resilient or yielding clutch parts so that the effective force causing the driving and driven clutch parts to grip one another will be applied over a considerable range of movement so that gradual application of the power of the motor to the driving wheels can be more easily accomplished. So far as I am aware most of the prior art devices include various kinds of deformed clutch plates, the deformed portions acting as spring fingers spaced away from the general plane of the plate and arranged to force the friction members gradually into engagement. When the clutch is fully engaged the deformed clutch plate or plates are firmly pressed together causing the deformed portions to occupy a position substantially in the plane of the clutch plate.

This type of clutch construction is subject to a number of disadvantages, chief of which is the fact that in manufacturing such deformed clutch plates in which it is necessary to spring out portions of the plate to form resilient fingers or the like, manufacturing tolerances must be materially increased since it is practically impossible to manufacture such plates under mass production conditions and bring each plate to substantially the same dimensions or to have different portions of the same plate exactly the same thickness, this being true because the ultimate position or dimension of the deformed portions particularly cannot be predicted or held to certain dimensions as can stock of uniform dimensions such as flat plates and the like. Flat stock, for example, can be manufactured and secured in which the thickness will vary only a small proportion of the variance which will be found to exist in deformed plates or other parts which must be bent or otherwise worked upon. Further, where such normally deformed spring fingers are bent when stressed and flat when the clutch is fully engaged, the initial resistance of the fingers to the beginning of the clutch engaging operation is frequently greater than when the clutch is almost fully engaged, which is just opposite to what is desired and what is secured by the present invention, namely, spring elements whose resistance to bending increases as the clutch becomes engaged, thereby gradually and smoothly clutching the driving and driven parts.

With these conditions in view, the present invention contemplates the provision of a clutch plate in which all of the parts are formed of substantially flat stock in which the thickness does not vary any material amount and securing these parts together so that the normal position of them is flat and not deformed, and in which, when the clutch is engaged, certain of the clutch parts are deformed to provide a soft, or yielding clutch operation. It will thus be observed that this is directly the opposite from the structures shown in the prior art, that is, where the prior art shows a deformed clutch plate which is pressed into flat relation when the clutch is engaged, the present invention contemplates arranging the clutch plate so that it normally is in its flat original position and when the clutch is engaged it is pressed out of its normal or flat relation. The result of this last named arrangement is that when the clutch plate and associated parts are assembled the dimensions of each are substantially the same as the dimensions of all of the others, so that, as compared with the prior art devices, permitted manufacturing tolerances are greatly reduced, and a yielding clutch plate is provided which grips lightly at first, but with increasing force as the clutch comes up to fully engaged position.

Another feature of importance in the present invention is the provision of a driven clutch plate which has a floating connection with its hub member, the latter being carried by the driven shaft. Generally, the clutch plate is riveted or otherwise rigidly secured to the hub with the result that the clutch plate is weakened or warped or other internal strains imposed thereon. The present invention obviates such defects by providing a loose floating connection in which the clutch plate is capable of a limited amount of both angular and linear displacement relative to the driven shaft.

Various conditions make it desirable to have a yielding clutch plate or one which has a floating connection with the driven shaft. In a single plate or twin plate type of friction clutch adapted to automotive and other high production uses the clutch proper is seldom, if ever, a perfect piece of mechanism. In an ideally perfect clutch the pressure plate or clamping ring will be constrained to move in a perfectly parallel manner toward the friction face of the fly wheel. In this way the width of the gap between the friction face of the fly wheel and the friction face of the pressure ring would be equal when measured at all points around the periphery at any time as the friction ring is moved in toward the fly wheel. If such a condition were to exist in a practical clutch it would be evident that no matter how much run-out or variation in thickness of the driven plate existed, the engagement of the clutch would be gradual and uniform. However, such a condition of parallelism of engagement seldom if ever exists. Usually an error of 0.005 to 0.015 of an inch in parallelism may be found in a production clutch. Under such conditions if the driven member is also at fault, either from running out excessively or varying in thickness from point to point, it can readily be seen that the clutch will not take hold evenly but will have a tendency to take hold and let go, due to the various combinations of run-out and parallelism which exist. It is to correct this non-uniform tendency of engagement that the cushion effect is set-up in the driven member. However, it is highly desirable to fabricate a driven plate in such a way that it will as nearly as possible approach the ideal.

The ideal driven plate would be one which had no run-out and which had exact uniform thickness at all points when measured over the two friction faces. Run-out may be caused from several conditions when the driven member is riveted to a hub member, certain strains may be set up which may cause the plate to warp out of true plane. Or if the clutch plate has been subjected to certain crimping operations to establish a cushion condition at its periphery certain strains may be set up which will cause run-out.

The exact thickness of the driven member is not so important, when held within the matter of a few thousandths, as it is to have a driven member which is of uniform thickness and with the minimum of run-out.

Other objects and advantages of the present invention will be apparent to those skilled in the art after a consideration of the following detailed description of a preferred structural embodiment, taken in conjunction with the accompanying drawings, in which:—

Figure 1 is a vertical elevation of a complete clutch plate embodying the principles of the present invention;

Figure 2 is a sectional view taken approximately along the line 2—2 of Figure 1, certain parts being shown in elevation;

Figures 3 and 4 are enlarged fragmentary sections showing, respectively, the position of the clutch plate disc and the associated friction rings on opposite sides thereof which these parts take, first, when the clutch is disengaged, that is, when the friction rings are not pressed together to secure driving engagement between the driving and driven clutch parts and, second, when the clutch is engaged;

Figure 5 shows a slightly different form of riveting employed to secure the friction rings to the clutch plate;

Figures 6, 7 and 8 are illustrative of different forms of friction rings or members;

Figures 9 and 10 illustrate a different form of connection between the clutch plate disc and the central hub, employing splines instead of a squared hub construction illustrated in Figures 1 and 2;

Figure 11 is a fragmentary cross-section illustrating a modified arrangement for retaining the disc loosely on the splines in the modification shown in Figures 9 and 10;

Figure 12 illustrates one method of punching or cutting the arcuate spacing members from a flat strip of stock; and Figures 13 and 14 are similar, respectively, to Figures 1 and 3 and illustrate a third form of riveting employed to secure the friction rings to the clutch plate. In this form the two friction rings are riveted to the same flexible sections and, in addition, the arcuate spacing segments are continuous.

Referring now to the drawings, particularly Figs. 1 and 2, the reference numeral 10 indicates the driving member of the clutch proper, the member 10 being in the illustrated embodiment the fly wheel of an internal combustion engine of an automotive vehicle or the like. The fly wheel 10 is secured in any manner desired to a bolting flange 11 secured to or forming a part of the crank shaft of the motor, and the fly wheel 10 includes a central recess 12 having a bushing 14 therein receiving the reduced end 15 of a driven shaft 16 connected with the usual propeller shaft of the vehicle. Generally, the forward end of the driven shaft 16 is splined, as indicated by the reference numeral 18, these splines carrying the driven member of the clutch proper, as indicated by the reference numeral 20. The driven member 20 is adapted to be frictionally clamped against the rear face of the fly wheel 10 by a pressure ring 21 rotatable with the fly wheel 10 by any suitable means (not shown). The pressure ring 21 is urged toward the clutch plate 20 and the fly wheel 10 by a spring 23.

To take care of the necessary slippage between the driving clutch parts, namely, the fly wheel 10 and the pressure ring 21, and the driven clutch part, namely, the clutch plate 20, suitable friction members or rings must be provided and suitably interposed between the parts to prevent a metal-to-metal contact and to secure a smooth operation. In a single plate type of clutch, such as the one illustrated in Figures 1 and 2, such friction members or rings are generally secured to the driven clutch plate, although as a matter of fact in a number of examples the driving clutch parts carry the friction members. It is to certain improvements in the driven clutch plate 20 and the associated friction members, indicated by the reference numerals 25 and 26, that the present invention has addressed itself.

As intimated above, in the manufacture of clutches in any appreciable quantity, and particularly under mass production conditions, it is extremely desirable to hold the individual clutch parts to very small permissible variations. For example, consider the clutch plate assembly 20. This assembly comprises a clutch plate disc 30, a central hub 31 and the friction rings 25 and 26. In manufacturing and assembling the clutch it becomes desirable, therefore, that in order to secure proper operation the distance between the exterior faces of the friction rings 25 and 26 should not vary. That is, these exterior faces should lie in exactly parallel planes so that there is no variation in thickness from point to point in any individual plate. Further, there should be practically no variation in the thickness of different clutch plates, otherwise the linkages and other parts associated with the fly wheel 10 and the pressure ring 21 must be individually adjusted, an expensive operation, or made loose enough to take care of the material variations referred to in the clutch plate. The requirements for separate adjustment and for looseness are both undesirable. As pointed out above, in a clutch plate which is of varying thickness chattering is likely to occur, also there would be uneven wear. The present invention therefore includes as one of the important features thereof the provision of a clutch plate of unvarying dimensions and a clutch plate assembly in which the distance between the outside faces of the clutch rings can be held to very small tolerance.

This important achievement is realized in spite of the fact that the clutch plate includes yielding or resilient members permitting relative movement between the two clutch rings or members to provide a soft and easily operated clutch.

The clutch plate assembly 20 shown in Figures 1 and 2 will now be described in detail. The central hub member 31 includes interior splines 32 which are received by the splines 18 on the driven shaft 16. A circumferential flange 35 of approximately square formation is formed on the hub 31 and is of a thickness considerably in excess of the thickness of the clutch disc 30, see Figure 2. Integral extensions or projections 38 are formed adjacent the corners of the square flange 35 for the purpose of loosely retaining the disc 30 in place on the hub 31. When the hub 31 is formed the extensions 38 are made to clear the central opening in the disc 30 so that the latter can be attached to the flange 35. After the disc has been placed on the flange 35 the projections 38 are hammered or otherwise deformed so as to extend beyond the square flange 35 and to be in a position to engage the disc 30, thereby holding the same on the square flange 35 without the use of rivets or the like.

As will be clear from Figure 2, the disc 30 is capable of a limited amount of axial movement on the hub 31, this axial movement being limited by the extensions 38. By virtue of this construction any angular misalignment which may exist between the axis of rotation of the fly wheel and the axis of rotation of the transmission clutch shaft will be compensated for by permitting the driven plate assembly to float on the periphery of the hub. Also any tendency to run out which might exist in a driven plate fixed rigidly by rivets to the hub member will be eliminated. Also, any axial shifting of the clutch disc 30 or any small inaccuracy in assembling the hub 31 on the driven shaft 16 will be compensated for. The fastening of the clutch disc 30 on the hub 31 without the use of rivets or the like has a number of advantages which will appear later. The square configuration of the hub flange 35 and the central opening in the clutch disc 30 afford a nonrotatable driving relation between these parts as will be readily understood. Obviously, any other irregular or polygonal shaped flange and disc opening could be employed with equal facility.

The periphery of the clutch disc 30 is provided with a plurality of radial slots 40 which form thereby a plurality of flexible portions or sections 42 in the nature of flexible fingers which extend radially from the central axis of the hub 31. The entire purpose of the flexible fingers or sections 42 is to provide on the disc 30 a peripherally disposed flexible or resilient portion or portions so that, as will be described in detail later, when the friction rings 25 and 26 are pressed together by engaging the clutch these flexible sections can yield thus providing a considerable range of movement of the pressure ring 21 during the process of clutching or gripping the driving and driven clutch parts together. While it is conceivable that the clutch disc 30 could be formed in a plain circular disc having a flexible peripheral portion, the slotted construction is preferred because somewhat better resiliency is secured, as will be apparent, since the flexing of the peripheral portion of a plain disc is somewhat difficult and introduces stresses other than those resulting from pure bending alone. It is to be understood, however, that the slots which may be used in connection with this type of cushion disc should not necessarily be limited to any particular design, shape, position, or direction. Neither will it be necessary in all instances that they extend through the periphery of the driven plate. It is a well understood fact in the fabrication of driven plates, that a cushion condition satisfactory to one make and model of automobile, may be entirely unsatisfactory to another model or make. These slots then, together with the thickness of material in the plate discs and the thickness and width of the spacing rings may take different forms and dimensions under the different conditions so as to always secure the correct amount and rate of driven plate cushion.

As stated above, one of the principal features of the present invention is the provision of a clutch plate which can be manufactured under mass production conditions and maintained within rigid tolerance requirements both as to run-out or variations in thickness and parallelism. As a means to this end it will be observed that the clutch disc 30, even after the flexible sections 42 are formed, is entirely flat and the only work performed on the disc 30, in addition to the punching of the necessary rivet holes and the central opening to receive the hub, is the punching of these slots 40. The disc 30 is not riveted to the hub and hence there is no danger of the disc 30 becoming distorted and warped as frequently results when discs are riveted to the hubs, the grip of the rivets sometimes varying so as to introduce internal stresses which cause warping and distortion of the clutch discs.

In order to provide for yielding relative movement between the clutch friction rings 25 and 26 these rings or friction members are connected to certain alternate ones of the resilient fingers or sections 42 by means arranged in staggered relation, that is, one friction member is connected to certain of the flexible sections at points spaced radially outward from the points at which the other friction ring is connected to certain of the other flexible sections. Preferably, the friction rings or friction members 25 and 26 are flat circular sections of uniform dimensions so that the manufacture of these members can be accomplished with the minimum amount of variance in dimensions. As best shown in Figs. 3 and 4, the connections for the friction ring 25 includes suitable rivets and spacing means positioned adjacent the outer ends of the flexible sections and the connections for the friction ring 26 includes similar rivets and spacing means positioned adjacent the inner end of the flexible sections so as to permit the desired relative movement between the friction members. The staggered relation of the rivets is clearly shown in Figure 1. For the friction member 25 spacing means in the form of three arcuate segments 50 are provided and interposed between the outer edge or marginal portion of the ring 25 and the outer ends of the flexible sections or portions 42. A number of rivets 51 are provided for securing the friction ring 25 and the arcuate segments 50 to the flexible sections 42. While it is possible to provide a rivet in every one of the flexible sections such is not necessary and, as shown in Figure 1, only two rivets 51 are provided for each of the arcuate segments 50.

For the other friction ring 26 spacing means in the form of three arcuate segments 55 are provided and interposed between the ring 26 and the base of the flexible sections 42 adjacent the inner margin or edge of the ring 26. As in the case of the other spacing means, rivets, indicated by the reference numeral 56, are used to secure the friction ring 26, the spacing segments 55 and the flexible sections 42 together. Any number of such rivets may be employed but two for each of the segments are usually sufficient. In this connection it will be noted that a sufficient number of flexible sections 42 are provided so that a rivet, either rivet 51 or rivet 56, passes through only every other flexible section 42 and that each of the friction rings is secured to only every fourth, or every other alternate, flexible section 42.

It is to be understood that while I have shown the spacing members as comprising arcuate segments, these members may take other forms and need not necessarily be segmental. They may, for example, be continuous. Also, the number and spacing of the rivets may vary, as well as the number of segments, if segments are provided, these parts and their arrangement being usually determined by the requirements of the friction facing and cushioning conditions. Further, the number and size of and connections associated with the flexible sections may vary.

Preferably, the rivets 51 securing the friction ring 25 to the clutch plate are countersunk in the material of the friction ring, and the rivets 56 securing the friction ring 26 to the clutch plate are similarly countersunk. While it is possible, as best shown in Figures 3 and 4, to have the friction ring 25 provided with apertures 60 to accommodate and receive the head of the rivet 56, both during the operation of riveting the ring 26 to the disc 30 and also when the friction rings 25 and 26 are pressed together, and also to have, in a similar manner, the friction ring 26 provided with apertures 61 to receive the heads of the rivets 51 securing the other friction ring, namely, friction ring 25, to the disc 30, the preferred construction is illustrated in Figure 5. Here the rivets 56' securing the friction ring 26 to the disc 30 are finished substantially flush with the opposite edge of the disc 30. Also the rivets 51' fastening the friction ring 25 to the outer ends of the flexible sections 42 are finished substantially flush with the opposite edge or surface of the flexible sections. Where the rivets are thus finished flush with the opposite surface of the flexibe sections the other friction ring need not be provided with apertures since there are no rivet heads to be received thereby. Thus it will be observed in Figure 5 that the friction ring 26 is not apertured as in the case illustrated in Figure 3. It is necessary, however, for other reasons to aperture the friction ring 25, as indicated by the reference numeral 60', in Figure 5, this being for purposes of assembly. In manufacturing the clutch plate shown in Figure 5 the friction ring 25 and associated spacing segments 50 are first riveted to the outer ends of the flexible sections 42. Next the friction ring 26 and associated spacing segments 55 are riveted, but in this case the apertures 60' are necessary in order that the rivets can be properly placed. It is obvious that the aperture in the one ring for the purpose of permitting the fastening of the other friction ring can be placed either near the inner edge of one of the rings or the outer edge of the other ring. Preferably, and as illustrated in Figure 5, the apertures 60' for this purpose are placed in the friction ring 25 and adjacent the inner margin or edge thereof.

This construction is a material improvement over a construction embodying additional openings in both clutch facings or friction members. The active area of the friction face is thus increased and, in addition, the labor cost and the cost of additional tools are reduced to the extent that at least one operation is eliminated. Further, the advantage which will result from an elimination of these clearance holes will be an increase in the total life of the facing and the elimination of the weak points which might otherwise exist near the outer periphery of one of the facings.

The flexing of the resilient periphery of the disc 30 when the clutch is engaged is illustrated in Figures 3 and 4. Figure 3 illustrates the parts when the clutch is disengaged. In this connection it will be noted that the disc 30 with its flexible sections 42 lies flat in a single plane. The friction rings 25 and 26 are all flat, as are the spacing segments 50 and 55. And when these parts are assembled in the manufacture of the clutch plate the overall thickness of the clutch plate, that is, the distance from the exterior face of the friction ring 25 to the exterior face of the friction ring 26 will be practically exactly the same for all of the other clutch plates and also for all portions of the same plate.

When the clutch is engaged the pressure ring 21 is moved toward the fly wheel 10 (Figure 2). This causes the friction rings 25 and 26 carried by the disc 30 to be pressed together. Due to the radial spaced relation of the spacing means or segments 50 and 55 relative movement between the friction rings 25 and 26 is permitted and which flexes or bends all of the flexible sections 22 out of the general plane of the disc 30, as illustrated in Figure 4. It is essential to note in this connection that, in the clutch plate constructed according to the present invention, when the friction rings are pressed together the resilient portions are bent out of the plane of the disc, whereas in the prior art such clutch plates are so constructed that the flexible portions are bent into the plane of the clutch disc and normally are deformed so as to occupy a position out of the general plane of the disc. As pointed out previously, it is much easier to form and manufacture parts and maintain them to rigid standards when they are substantially coplanar portions than when they are worked upon and have portions brought to different planes.

In Figures 1 to 5 the spacing means for connecting the friction rings to the flexible fingers 42 is shown as comprising a plurality of arcuate segments formed from flat stock. One means or method of manufacturing such spacing segments is illustrated, more or less diagrammatically in Figure 12. As there illustrated, a substantially rectangular or narrow strip of material is fed through a punch or cutting machine, the latter having an operating element which is curved to progressively sever the segments from the end of the strip 70 as the latter is continuously fed thereto. The lines 71 indicate the curvature of the operating member of the machine and the successive segments cut from the strip 70. Thickness of the stock is one factor in determining the degree of flexibility of the completed clutch plate.

Instead of forming the segments from a substantially flat strip and severing the segments by means of a curved die or the like, it is possible to utilize a strip curved in a transverse plane and fed to a substantially straight die or punch element in such an angular relation that the portions thus cut from the curved strip will, when flattened, form the arcuate segments.

Instead of a plurality of segments 50 and 55 it is possible to form spacing means for the two friction rings 25 and 26 in the form of continuous rings and such is contemplated by the present invention. The form shown in Fig. 1 is, however, preferable since due to the flexing of the resilient sections 42 a small change in the diameter of such continuous spacing ring means will occur and this will have to be taken care of by outward bowing of the spacing rings between the securing rivets. However, where spacing segments are utilized, this change of diameter can be taken care of by providing segments of a length so that the ends thereof are spaced apart a small amount (see Figure 1). Practically, the segments 50 and 55 are the full equivalent of a continuous ring, insofar as securing even wear. In the prior art many of the friction rings used with deformed plates wear away in spots.

Instead of separate spacing means in the form of rings, segments or the like, the present invention also contemplates the formation of spacing means directly on the friction rings themselves. Figure 6 illustrates such construction in which the friction rings are indicated by the reference numerals 80 and 81. Integral portions 83 and 84 are formed on the rings 80 and 81, the portion 83 being formed adjacent the outer margin of the ring 80 while the spacing portion 84 is formed adjacent the inner margin of the ring 81 so that, as in Figures 3 and 4 and Figure 8, the connections between the rings and the disc 30 are eccentrically disposed radially of the clutch disc so that as the rings 80 and 81 are pressed together the flexible sections 42 are bent.

Figure 7 illustrates a construction wherein the spacing rings or segments 86 and 87 are intimately associated with the friction rings 88 and 89, as by being molded or cast therewith at the same time the rings themselves are formed. In this case the spacing rings or segments 86 and 87 may be formed of metal, hard rubber, or of any other material desired.

Figure 8 illustrates a construction quite similar to that shown in Figures 3 and 4 but one in which the spacing rings or segments 50 and 55 are formed, not of metal as illustrated in Figures 3 and 4, but of the same material as the friction rings 25 and 26. Although of the same material as the friction rings 25 and 26, the spacing segments are formed as a separate operation and from entirely separate strips of stock. One advantage of forming these parts separately is that each can be formed of flat stock with the advantages mentioned above.

Figures 1 and 2 illustrate a construction wherein the central hub 31 was formed with a square flange received within a correspondingly formed opening in the clutch disc 30. Figures 9 and 10 show a construction wherein the flange of the hub 31 is splined, as indicated by the reference numerals 93. The central opening in the clutch disc 30 is also splined, as indicated at 94, and is thereby received in non-rotatable relation with respect to the hub 31 so that driving torque imparted to the clutch disc 30 is effectively transmitted to the driven shaft 16. In order to loosely retain the clutch disc 30 on the splines of the hub 31 while permitting a limited amount of both axial and angular displacement thereon, a pair of retaining rings 96 and 97 is provided and is assembled on opposite sides of the disc 30 when the latter is placed on the splines 93 of the clutch hub 31. After this is accomplished the edges or corners of the splines are given a blow by a suitable tool, thereby projecting the edges of the splines on opposite sides of the retaining rings 96 and 97. By this means the disc 30 is held on the hub 31. As a matter of fact, the retaining rings 96 and 97 are not absolutely essential since if the splines 93 are deformed a sufficient amount the projections or extensions will be in themselves sufficient to retain the disc 30 in place.

As an alternate construction for retaining the disc 30 in place, Figure 11 illustrates the clutch hub 31 as having the splines 93 thereof provided with two square grooves 100 and 101 formed therein circumferentially of the splined flange 35. Spring rings 103 and 104 are seated in the grooves 100 and 101 after the clutch disc 30 is in place, the diameter of the spring means being such that while they are securely seated within the grooves 100 and 101 a sufficient amount of the rings project above the surface of the splines to retain the disc 30 in place.

The modification illustrated in Figure 1 shows a construction where the two friction members or rings 25 and 26 were each secured to different flexible sections. The present invention also contemplates as one of the important features thereof a construction wherein both of the friction rings 25 and 26 are secured to the same flexible sections or portions but at different points.

Securing the friction rings 25 and 26 to the same flexible sections has a number of advantages over and above the construction illustrated in Figure 1, particularly under certain abnormal conditions which sometimes occur. It has been found that, where the clutch is operated under conditions tending to cause it to heat, the differences in expansion of the metal disc 30 as compared to the friction rings causes the flexible sections to bow out of the general plane of the clutch disc so as to materially increase the effective thickness of the clutch plate, that is, the difference between the outer surfaces of the friction rings 25 and 26 is increased. This is due primarily to the fact that the steel disc 30 expands more rapidly when heated than do the friction rings 26 and 26. The friction rings, therefore, exert a radially inward force on the flexible sections and if one ring is connected to certain of the flexible sections while the other ring is connected to other sections, the one ring causes the associated sections to bow in one direction while the other ring causes the other sections to bow in the opposite direction, thereby spreading or separating the friction rings.

While this occurs only under abnormal conditions, it may be desirable to avoid any possibility of its occurrence where such abnormal conditions exist. As one means to this end, the invention contemplates a third form of riveting for securing the friction rings to the clutch disc which is illustrated in Figures 13 and 14. Figure 13 corresponds to Figure 1 and like parts have the same reference numeral. The principal difference between the construction shown in Figure 1 and that shown in Figure 13 is that where in Figure 1 the friction ring on one side of the clutch disc is connected to certain of the flexible sections while the friction ring on the other side of the disc is connected to different flexible sections, Figure 13 illustrates a construction wherein the friction rings are both secured to the same flexible sections.

As shown in Figures 13 and 14, the friction ring 25 is secured to the clutch disc by rivets 151, there being six of such rivets and these rivets are secured to every fourth flexible section near the outer ends thereof. To receive the heads of the rivets 151 when the clutch is engaged and the friction rings 25 and 26 are pressed together, the friction ring 26 is provided with six openings or recesses 161. The other friction ring 26 is riveted to the same flexible sections by rivets 156 as best shown in Figure 14. Naturally, there are also six of these rivets 156, and the heads of these rivets are received within the openings 160 when the clutch is engaged. These openings 160 and 161 also provide holes to permit the insertion of the rivets and the convenient assembly of the clutch plate parts.

Instead of segmental spacing means, Figures 13 and 14 show the friction rings 25 and 26 spaced from the flexible sections by continuous rings 150 and 155, these being split, as at 150a and 155a, to allow for any change of diameter when the resilient sections are flexed.

The construction illustrated in Figures 13 and 14 avoids the possibility of having the flexible sections bow outwardly if the clutch plate should get hot by thus securing the friction rings on opposite sides of the disc to the same flexible sections, thereby balancing the forces which would otherwise tend to cause the flexible sections to spring outwardly. Referring more particularly to Figure 14, it will be seen that should the clutch plate become overheated and the clutch disc expand at a greater rate than the friction rings 25 and 26 the effect would be for each of the rings to exert a force radially inward with respect to the clutch disc 30. These forces are represented in Figure 14 by the arrows A and B. The arrow A represents the inward force exerted by the friction ring 25 and the arrow B represents the force exerted by the friction ring 26. Since these rings are attached, in the construction shown in Figures 13 and 14, to the same flexible section it will be seen that these forces will substantially balance one another so that the flexible section to which the rings are connected will not be deflected to any material extent. It is true, however, that the points of application of these forces are not exactly the same but experiments have determined that these forces are so nearly balanced that there is practically no increase in total thickness of the clutch plates even when the same is operated hot. This may be due to a number of factors, such as the fact that the flexible sections are substantially in the plane of the disc and it may also be due to the fact that when the clutch is engaged the flexible sections are flexed out of the plane of the disc and in such a direction that the flexing thereof opposes any possible bowing of the flexible sections due to the difference in the points of attachment of the friction rings to the disc. There may be also other and perhaps more dominating factors but I am not aware of them at the present time.

While from a manufacturing standpoint it may be desirable to provide each of the friction rings 25 and 26 with the additional or operating apertures 160 and 161 as shown in Figures 13 and 14, such is not absolutely essential to the present invention, for reasons made clear in the structure illustrated in Figure 5, and the present invention contemplates providing only one of the friction rings with such clearance holes.

The present invention also contemplates the provision of a clutch plate of the type described above having the more conventional type of riveted hub, as compared with my novel floating hub described, and such is illustrated in Figures 13 and 14. Here the central splined hub 131 is provided with a flange 135 to which the disc or plate 30 is riveted as by rivets 140. Other forms of hubs may be utilized.

Mention has been made that where the spring fingers are flat when unstressed and bent when the clutch is engaged (see Figures 3 and 4), by virtue of this arrangement, as the friction rings 25 and 26 are pressed toward one another the spring fingers or flexible sections 42 resist this movement with a gradually increasing force. This is true because each section acts as a cantilever beam which, as the friction rings approach one another, is bent an amount dependent on the thickness of the spacing segments 50 and 55, but which is sufficient to decrease the effective length of the section acting as a cantilever. It is well known that under a given load at the end, the maximum deflection of a cantilever varies as the cube of the length. Therefore, if the friction rings approach one another with a uniform rate, which corresponds to a uniform load, the spring sections will resist the relative movement of the friction rings with an increasing force as the flexing of the sections shortens their effective length. Therefore the force of friction between the rings 25 and 26 and the flywheel 10 and pressure ring 21 will be gradually built up, thus starting the vehicle smoothly and without grabbing or jerking, even though the clutch is rapidly engaged. This is not the case where the spring fingers are normally bent out of the plane of the clutch plate when the clutch is disengaged, for as these fingers are flattened their effective length increases and their resistance decreases, hence the gripping power of the friction rings does not gradually build up. I consider this an important feature of the present invention.

It will be seen from the above description of the structure illustrating my invention that I have disclosed numerous novel features which distinguish my invention from prior constructions of clutches and the like. I desire to emphasize that I have shown and described specific embodiments only for the purpose of showing means and ways of realizing the invention in practice, and not for the purpose of limiting the applicability or execution of my invention in points of details. Details may be modified and used in different combinations, as indicated throughout the above descriptions, to accommodate different purposes, without introducing novelty over what I have disclosed above. It will also be understood, of course, that other modifications may be provided in addition to those which I have taken occasion to mention above. I have made no attempt in this specification to illustrate all structural variations for the purpose of exhausting the possibilities which my invention presents but I am aware of these possibilities and intend to use and to exploit the invention in all of such forms and embodiments, as contemplated within the scope and meaning of the following claims.

What I claim, therefore, and desire to secure by Letters Patent is:—

1. A clutch plate having a plurality of slots adjacent the periphery thereof and providing a plurality of flat flexible sections, and friction members connected to said sections, said friction members being continuous and one member being connected with said sections at points spaced from the points at which the other member is connected with the sections, the friction members being spaced from the sections at other points, whereby when said friction members are pressed together said sections are flexed out of the plane of the plate.

2. A clutch plate having a plurality of radial slots extending inwardly from its periphery and providing a plurality of flexible fingers, friction rings arranged on opposite sides of said fingers, and means connecting one of said rings with only every other alternate finger.

3. A clutch plate having a plurality of slots adjacent the periphery and providing a plurality of flexible sections, a continuous friction ring arranged on each side of said sections, means disposed at the radially outer peripheral portion of one ring for securing that ring to certain of the sections of said clutch plate, the opposite ring overlying said securing means, and means disposed at the radially inner portion of the other ring for securing that ring to certain of said flexible sections, said first ring being provided with recesses opposite the radially inner securing means for said other ring.

4. A clutch plate comprising a substantially flat disc having flexible peripheral sections lying in the plane of the disc, friction rings arranged on opposite sides of said sections, and means spacing said rings from the plane of said disc, the means associated with one of said rings being connected to the sections at a different radial distance than the means associated with the other ring whereby when the friction rings are pressed together said sections are flexed out of the plane of the disc.

5. A clutch plate comprising a substantially flat disc having flexible peripheral sections lying substantially in the plane of the disc, friction rings on opposite sides of the disc, means providing a flat seat for one of said rings and secured to certain of said sections, and means providing a flat seat for the other ring spaced radially from the means for the first ring and connected to others of said sections, whereby when said friction rings are separated said sections lie in the same plane and when said rings are pressed together said sections are bent out of said plane.

6. A clutch plate comprising a substantially flat disc having flexible peripheral sections lying in the plane of the disc, friction members arranged on opposite sides of said sections, means disposed between one of said friction members and said sections including ring-like pacing means adjacent the inner edge of said member and fastening means passing through said member and said ring-like means and certain of said sections, and means disposed between the other of said friction members and said sections including a second ring-like spacing means adjacent the outer edge of said other member and fastening means passing through said other member, said second ring-like spacing means and certain of said flexible sections, whereby when said friction members are pressed together said flexible sections are bent out of the plane of said disc.

7. A clutch plate comprising a substantially flat disc having a flexible periphery, friction members arranged on opposite sides of said disc, one of said members having a radially inwardly disposed shoulder means adapted to contact with the flexible portion of said disc, the other friction member being provided with radially outwardly disposed shoulder means adapted to contact with the flexible portion of the disc at points spaced radially outwardly of said first named shoulder means, the remaining portions of said members being spaced from said disc, and means for connecting said members to said disc.

8. A clutch plate comprising a flat disc of substantially uniform thickness and having peripherally disposed flexible sections lying in the plane of the disc, friction rings of substantially uniform thickness arranged on opposite sides of the disc, spacing means comprising circular sections of substantially uniform thickness disposed between the inner margin of one of said rings and the disc and between the outer margin of the other ring and the disc, whereby when the friction rings are pressed together said flexible sections are deflected out of the plane of the disc, and means fastening one of the friction rings and the associated spacing means to certain of said flexible sections, and fastening means securing the other ring and its associated spacing means to other sections.

9. A clutch plate comprising a substantially flat disc having laterally flexible sections normally lying in the general plane of the disc when unstressed, friction rings arranged on opposite sides of said sections, and means spacing said rings from the plane of said disc, the means associated with one of said rings being connected to the sections at points spaced in the plane of the disc from the points at which the means associated with the other ring is connected whereby when the friction rings are pressed together said sections are flexed.

10. In a clutch, a flat clutch plate, a pair of spaced apart relatively movable friction members carried by said plate, one on each thereof opposite one another, said members being adapted to have relative movement toward one another and toward the plane of said plate when the clutch is being engaged, and means arranged between said members of said plate and operative by such relative movement to flex portions of said plate out of the plane thereof, said friction members having means spaced from said last named means and cooperating therewith for limiting the relative movement between said friction members and said plate.

11. A clutch plate comprising a substantially flat disc having laterally flexible sections normally lying in the general plane of the disc when unstressed, friction rings of substantially the same size arranged on opposite sides of said sections, and means serving as spacing rings disposed between said friction rings and said sections, said means on one side of said sections being positioned differently from the means on the other side of the sections, whereby when said friction rings are separated said sections lie in the same plane and when said rings are pressed together said sections are bent out of said plane.

12. A clutch plate comprising a substantially flat disc having laterally flexible sections normally lying in the general plane of the disc when unstressed, friction rings of substantially the same size arranged on opposite sides of said sections, and means serving as spacing rings disposed between said friction rings and said sections, said means on one side of said sections being positioned differently from the means on the other side of the sections, whereby when said friction rings are separated said sections lie in the same plane and when said rings are pressed together said sections are bent out of said plane.

13. In a clutch, a clutch disc having a plurality of coplanar flexible portions adapted to be flexed out of the plane of the disc when the clutch is engaged, endless friction ring members on opposite sides of the disc and having their outer faces disposed in planes parallel with respect to the plane of said clutch disc, and means for securing both ring members to said flexible portions, the friction member on one side contacting with the flexible portions at points lying in the plane of said disc but spaced radially from the points in said plane at which the friction member on the other side of the disc contacts with said flexible portions, whereby when said friction ring members are pressed together to occupy positions in successively parallel planes said flexible portions of the clutch disc are flexed out of the plane of the disc.

GEORGE I. GOODWIN.